G. P. RIGGS.
HUNTING KNIFE.
APPLICATION FILED SEPT. 26, 1908.
939,091.
Patented Nov. 2, 1909.
2 SHEETS—SHEET 2.
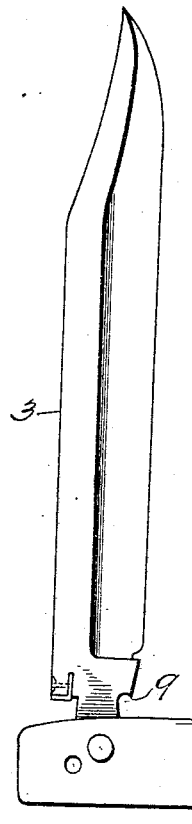
Fig. 3.
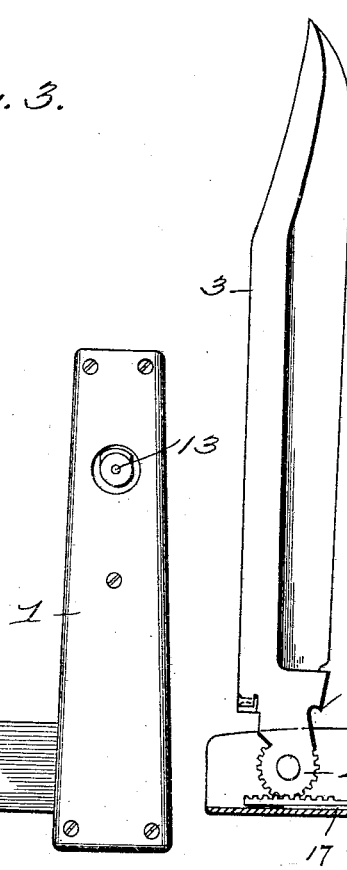
Fig. 4.
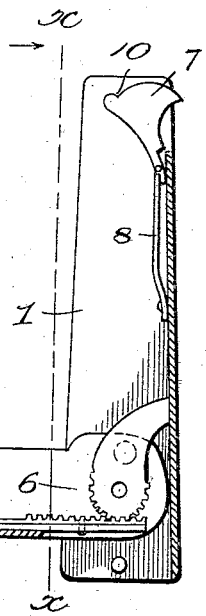
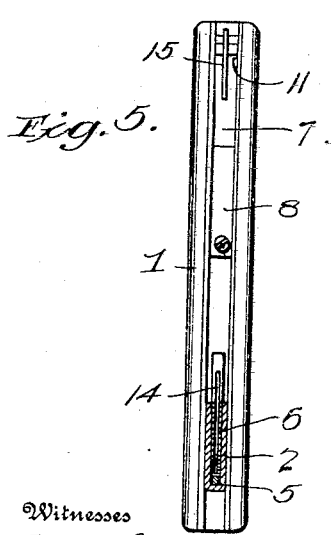
Fig. 5.
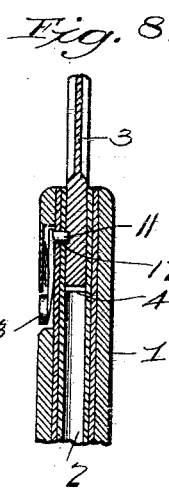
Fig. 8.
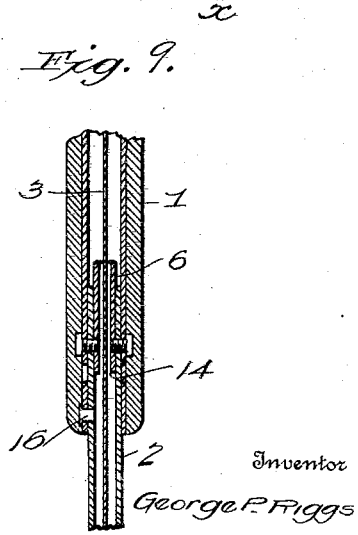
Fig. 9.
Witnesses
Inventor
George P. Riggs
By Edsen Bros
Attorneys

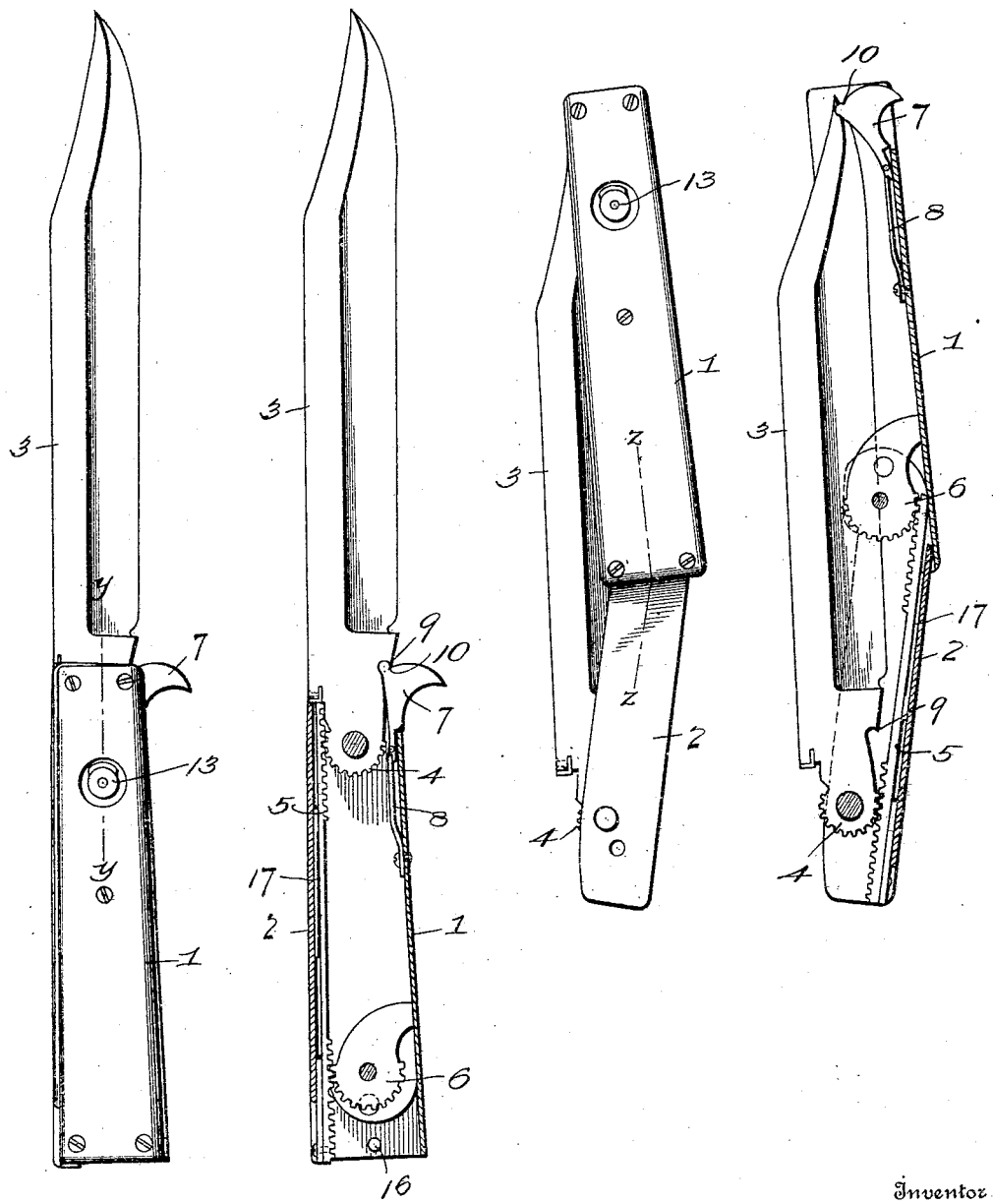

UNITED STATES PATENT OFFICE.

GEORGE P. RIGGS, OF ST. MARYS, WEST VIRGINIA.

HUNTING-KNIFE.

939,091. Specification of Letters Patent. Patented Nov. 2, 1909.

Application filed September 26, 1908. Serial No. 454,915.

*To all whom it may concern:*

Be it known that I, GEORGE P. RIGGS, a citizen of the United States, residing at St. Marys, in the county of Pleasants and State of West Virginia, have invented certain new and useful Improvements in Hunting-Knifes; and I do hereby declare the following to be a full, clear, and exact description of the invention, such as will enable others skilled in the art to which it appertains to make and use the same.

My invention relates to folded knives.

It has for its object to produce a hunting knife which can be folded into compact form for carrying in the pocket and which may be extended and locked in its open position when in use.

The invention consists in making the handle in two parts which are pivoted together and are adapted to fold one within the other. The blade is pivoted on the inner part of the handle and is so mounted as to have a positive opening and closing action when the inner part of the handle is closed and opened respectively.

The invention also consists in the features of construction and combinations of parts hereinafter described and specified in the claims.

In the accompanying drawings, illustrating the preferred embodiment of my invention: Figure 1 is a side view of the knife opened. Fig. 2 is a similar view showing the upper sides of both parts of the handle broken away. Fig. 3 is a side view showing the knife in a position intermediate of its opened and closed positions. Fig. 4 is a similar view showing the upper side of both parts of the handle broken away. Fig. 5 is a sectional view on the line x—x of Fig. 4 looking in the direction of the arrow. Fig. 6 is a side view of the knife closed. Fig. 7 is a longitudinal sectional view taken from side to side of the knife as shown in Fig. 6. Fig. 8 is a broken sectional view on the line y—y of Fig. 1 showing the spring-pressed catch for locking the blade in an open position, and Fig. 9 is a broken sectional view on the line z—z of Fig. 6 showing the catch for locking the knife in a closed position.

Referring more particularly to the drawings, I construct the handle in two parts, an outer part 1 and an inner part 2, the latter being pivoted near one end of the former and being adapted to fold within the same. The blade 3 is pivotally mounted near the opposite end of the inner part of the handle. On the inner pivoted end of said blade there is formed a segmental pinion 4 meshing with a rack bar 5 arranged to move longitudinally in the inner part of the handle. The other end of said rack bar meshes with a segmental pinion 6 located within the outer part of the handle at the pivoted end of said inner part of said handle. This arrangement of rack bar and pinions insures a positive opening and closing action to the blade when the inner part of the handle is closed or opened respectively upon the outer part.

A guard 7 is pivoted to fold into the outer part of the handle when the knife is closed. Said guard is pressed by a spring 8 which normally holds it in its folded position. As illustrated in Fig. 2 the bringing of the blade to its open position forces the guard out into its operative position. The blade is preferably provided with a tooth 9 which engages a notch 10 in the guard when the knife is open and prevents said guard from being extended farther.

The knife is locked in its open position by means of a spring pressed catch 11 mounted in the outer part of the handle and adapted to engage a depression or socket 12 in the inner part of said handle. Said catch is operated by a button 13 extending through an opening in the outer part of the handle to the surface thereof.

The segmental pinion 6 and the inner edge of the guard are grooved longitudinally as at 14 and 15 respectively to receive the cutting edge of the blade when folded in order to permit the knife to be folded more compactly.

As illustrated in Fig. 9, the knife is retained in its folded position by means of the rigid catch 16 arranged on the inner face of the outer part of the handle and adapted to engage a depression or socket in the inner part of said handle. The resiliency of the outer part of the handle is sufficient to permit this catch to ride in and out of the socket as the knife is closed and opened.

It will be noted that the construction of my knife is such that it can be easily opened and closed and can be carried in both its open and closed position with perfect safety.

A spring 17 may be placed below the rack bar, as shown, to hold it always in mesh with the pinions and to take up wear.

I claim:

1. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed.

2. In a folding knife, the combination, with a handle in two parts, one adapted to be folded into the other or extended in line therewith, of a blade mounted on the inner part of said handle, and means of connection between said blade and handle whereby the inner part of the handle is closed as the blade is opened and opened as the blade is closed, the cutting edge of said knife when closed being housed partially in each part of said handle.

3. In a folding knife, the combination, with a handle in two parts, one adapted to be folded into the other or extended in line therewith, of a blade mounted on the inner part of said handle, and means of connection between said blade and handle whereby the inner part of the handle is closed as the blade is opened and opened as the blade is closed, and means to lock said blade in an open position comprising a spring-pressed catch mounted on the outer part of the handle and adapted to engage a notch in the inner part of said handle.

4. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed, and means to lock said blade in an open position comprising a spring-pressed catch mounted on the outer part of the handle and adapted to engage a notch in the inner part of said handle, and a push button extending through the outer part of the handle for releasing said catch.

5. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed, and means to lock said blade in a closed position comprising a catch on the outer part of the handle adapted to engage a notch in the inner part of said handle.

6. In a folding knife, the combination, with a handle in two parts, one pivoted to and adapted to be folded into the other or extended in line therewith, of a blade pivoted on the inner part of said handle, a rack bar arranged in said inner part of the handle and engaging segmental pinions formed on the pivoted end of said knife and on the pivoted end of the outer part of the handle whereby said blade has positive opening and closing actions when the inner part of the handle is closed and opened respectively.

7. In a folding knife, the combination, with a handle in two parts, one pivoted to and adapted to be folded into the other or extended in line therewith, of a blade pivoted on the inner part of said handle, a rack bar arranged in said inner part of the handle and engaging segmental pinions formed on the pivoted end of said knife and on the pivoted end of the outer part of the handle whereby said blade has positive opening and closing actions when the inner part of the handle is closed and opened respectively, the pinion on the outer handle being grooved longitudinally to receive the cutting edge of the blade when folded.

8. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed, and a guard adapted to be folded into the outer part of the handle when the blade is closed.

9. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed, and a guard adapted to be folded into the outer part of the handle when the blade is closed, said guard having a longitudinal groove in its inner edge to receive the cutting edge of said blade.

10. In a folding knife, the combination, with a handle in two parts, one adapted to be folded into the other or extended in line therewith, of a blade mounted on the inner part of said handle and means of connection between said blade and handle whereby the inner part of the handle is closed as the blade is opened and opened as the blade is closed, and a guard adapted to be folded into the outer part of the handle when the blade is closed, said blade carrying a tooth adapted to engage a notch in said guard when said blade is open.

11. In combination with a blade of greater length than its handle, a two-part handle comprising a handle portion and an extension thereon, and means coöperating therewith whereby when the knife is closed the two part handle is extended and the blade is guarded thereby and when the knife is opened the two-part handle is closed upon itself and the blade is exposed.

12. In combination with a blade of greater length than its handle, a two-part handle comprising a handle portion and an extension thereon, the blade, handle portion and extension being pivoted together end to end, and provided with means whereby when the knife is closed the two-part handle is extended and the blade is guarded thereby, and when the knife is opened the two-part handle is closed upon itself and the blade is exposed.

In testimony whereof, I affix my signature, in presence of two witnesses.

GEO. P. RIGGS.

Witnesses:
   CLYDE B. JOHNSON,
   R. BOLARD, Jr.